United States Patent [19]

Yoon et al.

[11] Patent Number: 6,064,684
[45] Date of Patent: May 16, 2000

[54] UNIDIRECTIONALLY OPERATING LASER APPARATUS USING SEMIMONOLITHIC RING CAVITY

[75] Inventors: Tai Hyun Yoon; Jong Rak Park; Myung Sai Chung; Hai-Woong Lee, all of Taejon, Rep. of Korea

[73] Assignee: Korea Research Institute of Standards and Science, Taejon, Rep. of Korea

[21] Appl. No.: 09/084,794

[22] Filed: May 27, 1998

[30] Foreign Application Priority Data

Apr. 21, 1998 [KR] Rep. of Korea ........................ 98-14175

[51] Int. Cl.[7] .................................................... H01S 3/083
[52] U.S. Cl. .............................. 372/94; 372/66; 372/105; 372/106
[58] Field of Search .................................. 372/27, 37, 66, 372/92–94, 98, 99, 105, 106

[56] References Cited

U.S. PATENT DOCUMENTS

| | | | |
|---|---|---|---|
| 4,747,111 | 5/1988 | Trutna, Jr. et al. | 372/94 |
| 4,764,933 | 8/1988 | Kozlovsky et al. | 372/66 X |
| 5,007,065 | 4/1991 | Trutna, Jr. | 372/94 |
| 5,177,764 | 1/1993 | Nilsson | 372/94 |
| 5,862,164 | 1/1999 | Hill | 372/27 |

*Primary Examiner*—John D. Lee
*Attorney, Agent, or Firm*—Jacobson, Price, Holman & Stern, PLLC

[57] ABSTRACT

A unidirectionally operating laser apparatus using a semimonolithic ring cavity having a compact structure capable of achieving a high frequency stability and a high-speed laser frequency tuning and modulation. The laser apparatus includes a laser active medium having a curved surface exhibiting an anti-reflection characteristic for a pump laser beam from a pump laser incident thereon while exhibiting a high reflection characteristic for an oscillating laser beam, a planar surface exhibiting an anti-reflection characteristic for the oscillating laser beam, and an optically-active polarization rotator attached to one side portion of the planar surface. The laser apparatus also includes an output mirror separated from the laser active medium, the output mirror having a curved surface with a coating exhibiting a higher reflectance coefficient for S-polarized beams than that for P-polarized beams, and a piezo-electric transducer. The laser apparatus is applicable to a variety of scientific fields using continuous-wave wavelength-tunable lasers.

5 Claims, 5 Drawing Sheets

UNIDIRECTIONALLY OPERATING LASER APPARATUS USING SEMIMONOLITHIC RING CAVITY

BACKGROUND OF THE INVENTION

1. Field of the Invention

The present invention relates to a unidirectionally operating laser apparatus using a semi-monolithic ring cavity having a structure including a laser active medium and an optically active polarization rotator or half-wave plate, along with a conventional mirror adapted to generate a continuous-wave, wavelength-tunable laser output, thereby being capable of operating at a single longitudinal mode while achieving a frequency tuning and modulation at a high speed and a high power stability.

2. Description of the Prior Art

Generally, laser devices have two mirrors to constitute a laser cavity. In such a conventional laser device, a spatial hole burning phenomenon, caused by a standing-wave distribution of the laser intensity in the cavity, occurs. Such a spatial hole burning phenomenon prevents a laser device from operating at a single frequency in its homogeneously line-broadened laser medium. As a result, several longitudinal modes oscillate simultaneously in the laser cavity. In order to eliminate the formation of a standing wave in the laser medium, it is required to make a laser beam travel in a single direction in the laser cavity. Therefore, a laser device has been proposed which includes a ring cavity using three or four mirrors. Usually an optical diode is inserted in the ring cavity to achieve a unidirectional operation.

Such an optical diode serves to generate a higher optical loss in one of laser waves traveling in two different directions in the ring cavity. The laser wave with a higher optical loss results in no laser oscillation. Accordingly, laser oscillation occurs in the direction along which the laser wave with a lower optical loss travels. The optical diode consists of a reciprocal polarization rotator, a nonreciprocal polarization rotator, and a polarizer. The reciprocal polarization rotator may include an optically active polarization rotator or a half-wave plate. The nonreciprocal polarization rotator may include a Faraday rotator. On the other hand, the polarizer may include an optical element capable of generating a higher optical loss in one of two polarization states orthogonal to each other. To this end, conventional polarizers may be used. Alternatively, a laser rod with a Brewster angle may be used.

When a laser beam with a certain polarization state passes through a polarization rotator, it is transformed into a polarization state different from its original polarization state. When the transformed laser beam passes reversely through the polarization rotator, its original polarized state may be recovered in accordance with the feature of the polarization rotator used. Such a polarization rotator is called a "reciprocal polarization rotator.

FIG. 4 illustrates operation characteristics of a half-wave plate which is a reciprocal polarization rotator. In FIG. 4, the half-wave plate is denoted by the reference numeral 21. Where a laser beam with a linear polarization state $P_1$ is transformed into a linear polarization state $P_2$ as it rotates by an angle $\gamma$ while traveling in a direction from left to right through the half-wave plate 21, its polarization state is recovered from the state $P_2$ to its original polarization state $P_1$ when it travels in a direction from right to left through the half-wave plate 21 because it rotates reversely by the angle $\gamma$.

In the case of a nonreciprocal polarization rotator, no recovery of the polarization state of a laser beam transformed after passing through the polarization rotator in one direction occurs after the laser beam passes reversely through the polarization rotator. Rather, the same transformation as the first transformation occurs again.

FIG. 5 illustrates operation characteristics of a Faraday rotator which is a nonreciprocal polarization rotator. In FIG. 5, the Faraday rotator is denoted by the reference numeral 23. Where a laser beam with a linear polarization state $P_1$ is transformed into a linear polarization state $P_2$ as it rotates by an angle $\gamma$ while traveling in a direction from left to right through the Faraday rotator 23, its polarization state is transformed again from the state $P_2$ to a polarization state $P_3$ when it travels in a direction from right to left through the Faraday rotator 23 because it rotates again by the angle $\gamma$.

Referring to FIG. 6, a well-known unidirectionally-operating laser cavity with four mirrors is illustrated [Reference: Walter Koechner, Solid-State Laser Engineering (Springer, N.Y., 1996) Chap. 3, p.140 and the reference therein]. As shown in FIG. 6, the laser cavity uses an optical diode which consists of a half-wave plate 21, a Faraday rotator 23, and a laser medium with a Brewster angle 24. Assuming that the half-wave plate 21 and Faraday rotator 23 are configured to rotate the plane of polarization of a wave traveling clockwise by angles of $\beta$ and $\theta$, respectively, they rotate the plane of polarization of a wave traveling counterclockwise by angles of $\beta$ and $-\theta$, respectively. In this case, accordingly, the difference, $\Delta\alpha$, in the power loss generated in a polarizer between two waves traveling in opposite directions corresponds to "$\sin^2(\beta+\theta)-\sin^2(\beta-\theta)$" [$\Delta\alpha=\sin^2(\beta+\theta)-\sin^2(\beta-\theta)$]. Therefore, the laser device oscillates in a direction with a lower power loss, namely, counterclockwise. In FIG. 6, the reference numeral 25 denotes a laser rod which is used for the polarizer.

Generally, continuous-wave tunable laser devices are classified into those of an open cavity and those of a monolithic cavity.

The open cavity uses four or three mirrors to constitute a planar ring cavity. Optical components such as a laser active medium, a Faraday rotator, a half-wave plate and a polarizer are inserted in the planar ring cavity. The laser medium may be configured to have Brewster angles at opposite ends thereof, so that it serves as a polarizer.

In the case of the open cavity, the four or three mirrors constituting a ring cavity are separated from the laser medium. The Faraday rotator and half-wave plate, which serve as an optical diode, are inserted in the cavity such that they are positioned on an optical path defined in the cavity. Since the open cavity consists of several optical components, it is very bulky as compared to the monolithic cavity. Furthermore, the open cavity is mechanically instable because the optical components thereof are mounted to different optical mounts, respectively. This results in considerably low laser power and frequency stability.

On the other hand, the monolithic cavity is a cavity in which a single laser active medium has all functions of the Faraday rotator, half-wave plate and polarizer. This monolithic cavity has a non-planar ring cavity structure.

In other words, the monolithic cavity has a structure capable of eliminating drawbacks involved in the open cavity. Since all optical components of a ring cavity required for a unidirectional operation are formed integrally into a single laser active medium, the entire structure is very compact and mechanically stable. Accordingly, considerably high laser power and frequency stability are obtained. In such a monolithic cavity, however, there is no optical component enabling a frequency tuning in any portion of the monolithic cavity except for the laser active medium. To this end, frequency tuning is achieved in this monolithic cavity by mainly controlling the temperature of the laser active medium. However, such a frequency tuning and modulating method based on the temperature control is carried out at a very low speed because it depends on a time constant of the active medium. In addition, it is required to fabricate the laser active medium in order to make a non-planer ring cavity. This results in a difficulty in the design and fabrication of the non-planar ring cavity as compared to planar ring cavities.

SUMMARY OF THE INVENTION

Therefore, an object of the invention is to solve the drawbacks of open cavities, such as a bulky structure and a low frequency stability, and the drawbacks of monolithic cavities, such as a slow frequency tuning and modulation, and to provide a unidirectionally operating laser apparatus using a semi-monolithic ring cavity capable of operating at a single frequency while achieving a frequency tuning and modulation at a high speed and a high power stability.

In accordance with the present invention, this object is accomplished by providing a unidirectionally operating laser apparatus using a semi-monolithic ring cavity comprising: a laser active medium having a curved surface with a coating exhibiting an anti-reflection characteristic for a pump laser beam from a pump laser incident thereon while exhibiting a high reflection characteristic for an oscillating laser beam, a planar surface exhibiting an anti-reflection characteristic for the oscillating laser beam, and an optically-active polarization rotator attached to one side portion of the planar surface; and an output mirror separated from the laser active medium, the output mirror having a curved surface with a coating exhibiting a higher reflectance coefficient for S-polarized beams than that for P-polarized beams, and a piezo-electric transducer for a fast frequency tuning.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
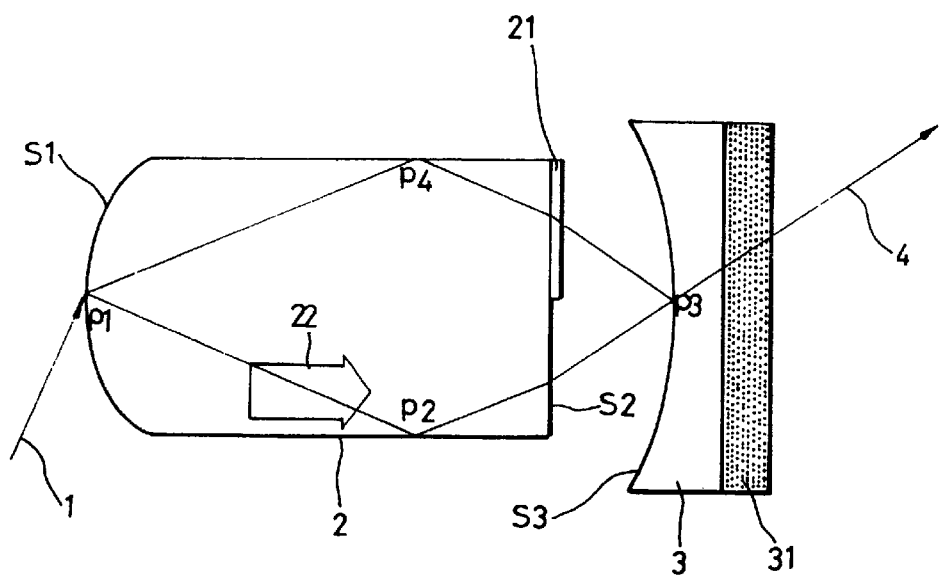
FIG. 1 is a schematic view illustrating a unidirectionally operating laser apparatus using a semi-monolithic ring cavity according to the present invention.

Referring to FIG. 1, a unidirectionally operating laser apparatus using a semi-monolithic ring cavity according to the present invention is illustrated.

As shown in FIG. 1, a beam 1 emitted from a pump laser is incident onto a curved surface Si, so that it is absorbed into the interior of a laser active medium 2. A laser oscillation occurs on a plane along an optical path defined by a point P1, where the pump laser beam 1 is incident onto the laser active medium 2, a point P2, where the oscillating laser beam is totally reflected from the internal surface of the laser active medium 2, a point P3, where the oscillating laser beam is incident onto an output mirror 3, and a point P4, where the oscillating laser beam is totally reflected from the internal surface of the laser active medium 2. The oscillating laser beam inside of the cavity is coupled out through a curved surface S3 of the output mirror 3 which, in turn, generates a laser output 4 in one direction.

An optically-active polarization rotator or half-wave plate 21 is attached to one side portion of a planar surface S2 of the laser active medium 2. The optically-active polarization rotator or half-wave plate 21 serves as a reciprocal polarization rotator included in an optical diode according to the present invention. When a magnetic field 22 is exerted on the laser active medium, for example Nd:YAG etc., by a permanent magnet, a Faraday effect is induced in the laser active medium 2, thereby causing the laser active medium 2 itself to serve as a Faraday rotator. That is, the laser active medium 2 serves as a nonreciprocal polarization rotator. The curved surface S3 of the output mirror 3 is coated so that it exhibits a higher reflectance coefficient for S-polarized beams than that for P-polarized beams. That is, the output mirror 3 serves as a partial polarizer.

The above three optical components (namely, the optically-active polarization rotator or half-wave plate, the Faraday effect-induced laser active medium and the output mirror serving as a partial polarizer) serve together as an optical diode. Thus, a unidirectional oscillation is achieved.

As apparent from the above description, the a unidirectionally operating laser apparatus using the semi-monolithic ring cavity according to the present invention is constructed of only the laser active medium 2 applied with the magnetic field 22, the optically-active polarization rotator or half-wave plate 21 attached to the laser active medium 2, and the output mirror 3. Accordingly, it is possible to fabricate a laser device having a very compact structure as compared to conventional open cavities. Furthermore, the unidirectionally operating laser apparatus of the present invention is mechanically stable, thereby obtaining a superior frequency stability.

In accordance with the present invention, the laser active medium 2 and laser output mirror 3 constituting a cavity are separated from each other. The laser output mirror 3 can also be incorporated in a piezo-electric transducer which is denoted by the reference numeral 31 in FIG. 1. In this case, it is possible to achieve a frequency tuning and modulation at a high speed. Therefore, the laser apparatus of the present invention solves drawbacks involved in conventional monolithic cavities, namely, slow frequency tuning and modulation.

Since the cavity of the present invention has a planar ring structure, it is possible to achieve an easy design and fabrication thereof as compared to the non-planar ring structure of conventional monolithic cavities.

The present invention will be understood more readily with reference to the following example; however this example is intended to illustrate the invention and is not to be construed to limit the scope of the present invention.

EXAMPLE

Figure 2:
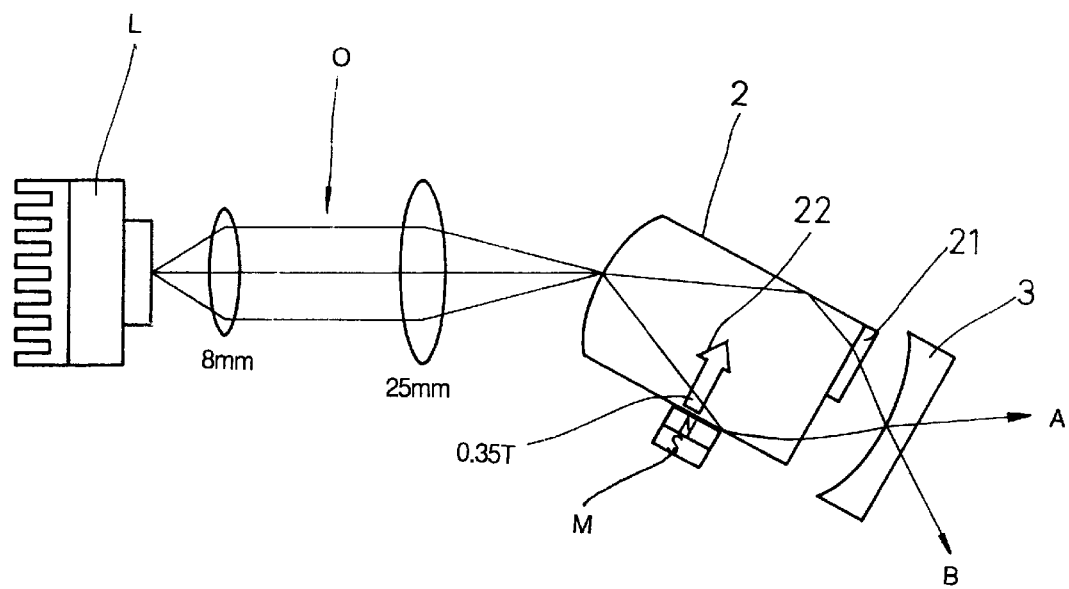
FIG. 2 is a schematic view illustrating an experimental setup for demonstrating a unidirectional laser oscillation.

FIG. 2 illustrates an experimental setup for demonstrating a unidirectional laser oscillation. In this experiment, an SDL 2362P1 was used as a pumping diode laser L. The SDL 2362P1 is designed to generate an optical power of 1.2 W at a wavelength of about 809 nm when a drive current of 1.6 A is used. The output of the diode laser L is coupled to an Nd:YAG crystal 2 via an optical system including a collimating lens with a focal length 8 mm lens and a focusing lens with a focal length 25 mm. An output mirror 3 was also used which exhibits a reflectance coefficient of 91% for S-polarized beams and a reflectance coefficient of 50% for P-polarized beams. The Nd:YAG crystal 2 is attached at its planar surface with a quartz rotator 21 made of a crystal quartz having a thickness of 0.5 mm. Crystal quartz is a representative reciprocal polarization rotator. A Faraday effect was induced in the Nd:YAG crystal 2 using a permanent magnet M. In this case, the strength of the magnetic field 22 was about 0.35 T at the surface of the permanent magnet M. When no magnetic field 22 was applied to the Nd:YAG crystal 2, bidirectional laser oscillation occurred, so that optical detectors A and B detected laser outputs 4 of the same intensity.

Figure 3:
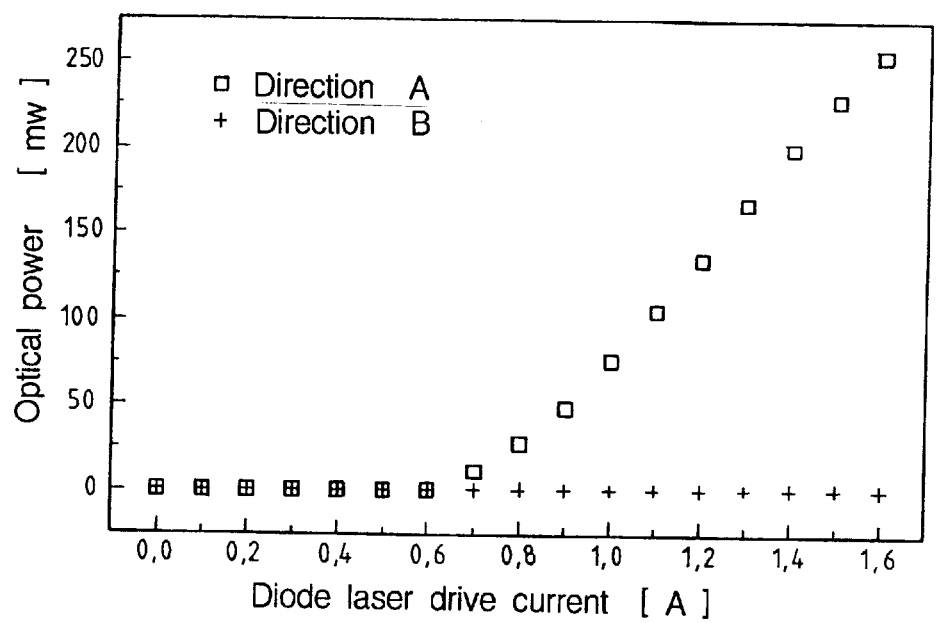
FIG. 3 is a graph depicting an experimental result obtained when a magnetic field is applied to an Nd:YAG crystal in the structure of FIG. 2 using a permanent magnet.
Figure 4:
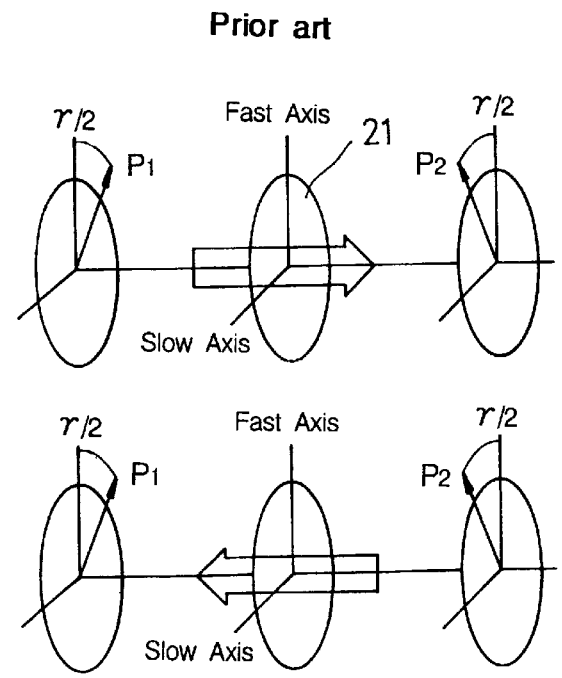
FIG. 4 is a schematic view illustrating operation characteristics of a half-wave plate which is a reciprocal polarization rotator.
Figure 5:
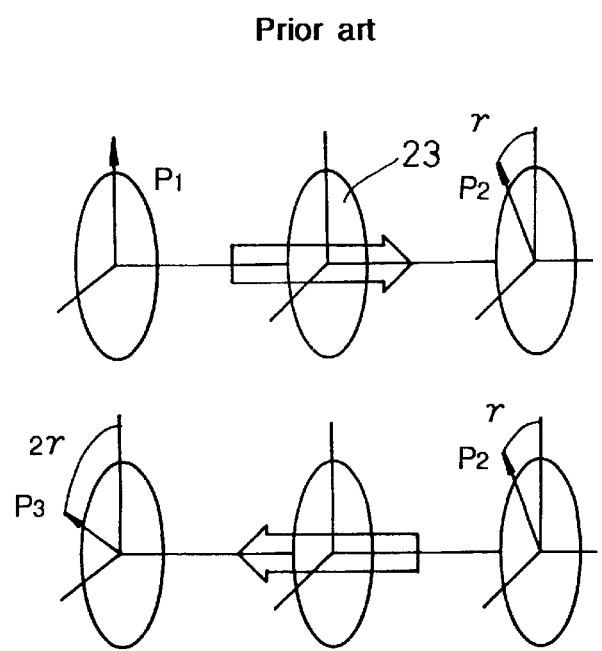
FIG. 5 is a schematic view illustrating operation characteristics of a Faraday rotator which is a nonreciprocal polarization rotator.
Figure 6:
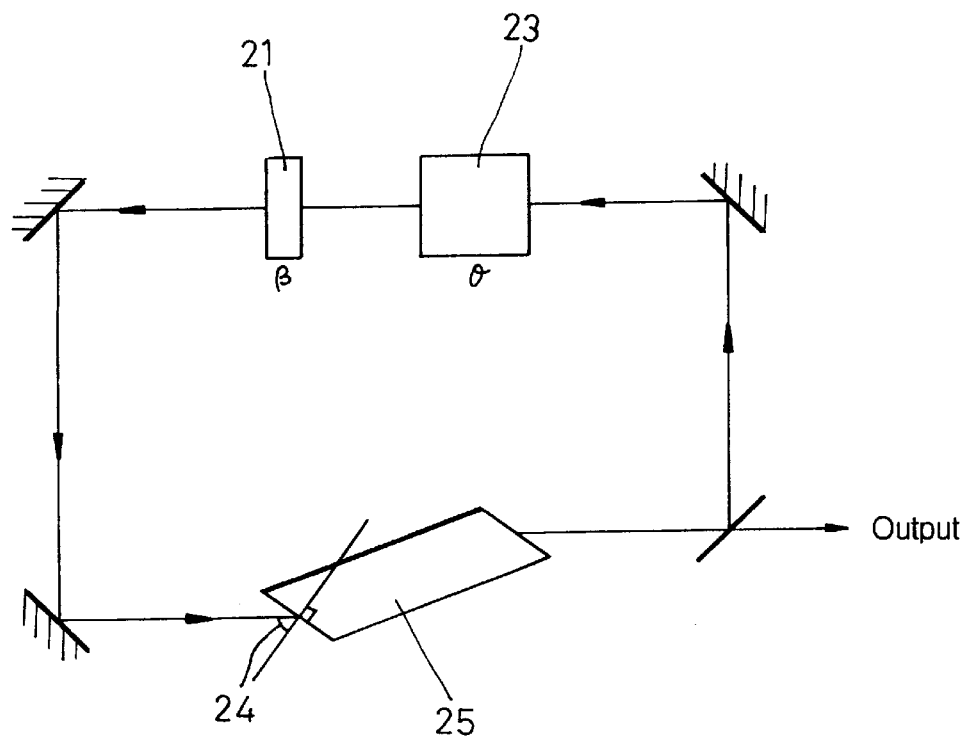
FIG. 6 is a schematic view illustrating a well-known unidirectionally-operating laser cavity.

When a magnetic field was applied to the Nd:YAG crystal using the permanent magnet, as shown in FIG. 2, an experimental result shown in FIG. 3 was obtained. That is, counterclockwise laser oscillation was observed whereas there was no clockwise laser oscillation observed. When the same experiment as mentioned above was carried out under the condition in which the polarity of the permanent magnet was reversed, clockwise laser oscillation occurred whereas there was no anti-clockwise laser oscillation.

As apparent from the above description, the present invention provides a unidirectionally operating laser apparatus using a semi-monolithic ring cavity having a compact structure capable of achieving a high frequency stability and a high-speed laser frequency tuning and modulation. Accordingly, the laser apparatus of the present invention is applicable to a variety of scientific fields using continuous-wave wavelength-tunable lasers.

That is, it is possible to develop a compact, high-power, high-stable, continuous-wave tunable solid-state laser optically pumped by a highly stable diode laser, using the unidirectionally operating laser apparatus according to the present invention. In particular, it is possible to develop an optical frequency standard having a superior stability by virtue of the high frequency tuning characteristic of the cavity according to the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A unidirectionally operating laser apparatus using a semi-monolithic ring cavity comprising:

a laser active medium having a curved surface exhibiting an anti-reflection characteristic for a pump laser beam from a pump laser incident thereon while exhibiting a high reflection characteristic for an oscillating laser beam, a planar surface exhibiting an anti-reflection characteristic for the oscillating laser beam, and an optically-active polarization rotator attached to one side portion of the planar surface; and an output mirror separated from the laser active medium, the output mirror having a curved surface with a coating exhibiting a higher reflectance coefficient for S-polarized beams than that for P-polarized beams, and a piezo-electric transducer.

2. The unidirectionally operating laser apparatus according to claim 1, wherein three elements, namely, the optically-active polarization rotator serving as a reciprocal polarization rotator, the laser active medium serving as a reciprocal polarization rotator in accordance with a Faraday effect induced by a magnetic field applied thereto, and the curved surface of the output mirror serving as a partial polarizer by virtue of the coating exhibiting a higher reflectance coefficient for S-polarized beams than that for P-polarized beams, serve as an optical diode, thereby achieving a unidirectional laser oscillation.

3. The unidirectionally operating laser apparatus according to claim 1, wherein the optically-active polarization rotator is replaced with a half-wave plate.

4. The unidirectionally operating laser apparatus according to claim 1, wherein the incident pump laser beam oscillates on a plane along an optical path defined by a point, where the pump laser beam is incident onto the laser active medium, a point, where the oscillating laser beam is totally reflected from the internal surface of the laser active medium, a point, where the oscillating laser beam is incident onto the output mirror, and a point, where the oscillating laser beam is totally reflected from the internal surface of the laser active medium, and the oscillating laser beam is then coupled out through the curved surface of the output mirror which, in turn, generates a unidirectional laser output.

5. The unidirectionally operating laser apparatus according to claim 1, wherein the piezo-electric transducer drives the output mirror in order to achieve a high-speed frequency tuning and modulation.

\* \* \* \* \*